US011809322B2

(12) United States Patent
Kalyanasundharam et al.

(10) Patent No.: US 11,809,322 B2
(45) Date of Patent: *Nov. 7, 2023

(54) REGION BASED DIRECTORY SCHEME TO ADAPT TO LARGE CACHE SIZES

(71) Applicant: Advanced Micro Devices, Inc., Santa Clara, CA (US)

(72) Inventors: Vydhyanathan Kalyanasundharam, Santa Clara, CA (US); Kevin M. Lepak, Austin, TX (US); Amit P. Apte, Austin, TX (US); Ganesh Balakrishnan, Austin, TX (US); Eric Christopher Morton, Austin, TX (US); Elizabeth M. Cooper, Los Gatos, CA (US); Ravindra N. Bhargava, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,977

(22) Filed: Sep. 13, 2021

(65) Prior Publication Data
US 2021/0406180 A1 Dec. 30, 2021

Related U.S. Application Data

(63) Continuation of application No. 15/846,008, filed on Dec. 18, 2017, now Pat. No. 11,119,926.

(51) Int. Cl.
*G06F 12/0817* (2016.01)
*G06F 12/128* (2016.01)
(Continued)

(52) U.S. Cl.
CPC ...... *G06F 12/0817* (2013.01); *G06F 12/0811* (2013.01); *G06F 12/0831* (2013.01);
(Continued)

(58) Field of Classification Search
None
See application file for complete search history.

(56) References Cited

U.S. PATENT DOCUMENTS 5,463,753 A  10/1995  Fry et al.
6,101,581 A  8/2000  Doren et al.
(Continued)

FOREIGN PATENT DOCUMENTS

JP  H08263374 A  10/1996
JP  H09311820 A  12/1997
(Continued)

OTHER PUBLICATIONS

International Search Report and Written Opinion in International Application No. PCT/US2018/051765, dated Nov. 26, 2018, 12 pages.

(Continued)

*Primary Examiner* — Jane W Benner
(74) *Attorney, Agent, or Firm* — KOWERT HOOD MUNYON RANKIN AND GOETZEL PC; Rory D. Rankin

(57) ABSTRACT

Systems, apparatuses, and methods for maintaining a region-based cache directory are disclosed. A system includes multiple processing nodes, with each processing node including a cache subsystem. The system also includes a cache directory to help manage cache coherency among the different cache subsystems of the system. In order to reduce the number of entries in the cache directory, the cache directory tracks coherency on a region basis rather than on a cache line basis, wherein a region includes multiple cache lines. Accordingly, the system includes a region-based cache directory to track regions which have at least one cache line cached in any cache subsystem in the system. The cache directory includes a reference count in each entry to track the aggregate number of cache lines that are cached per region.

(Continued)

If a reference count of a given entry goes to zero, the cache directory reclaims the given entry.

20 Claims, 14 Drawing Sheets

(51) Int. Cl.
    *G06F 12/0811*     (2016.01)
    *G06F 12/0871*     (2016.01)
    *G06F 12/0831*     (2016.01)

(52) U.S. Cl.
    CPC ........ *G06F 12/0871* (2013.01); *G06F 12/128* (2013.01); *G06F 2212/283* (2013.01); *G06F 2212/604* (2013.01); *G06F 2212/621* (2013.01)

(56) References Cited

U.S. PATENT DOCUMENTS

| | | |
|---|---|---|
| 6,295,598 B1 | 9/2001 | Bertoni et al. |
| 6,754,782 B2 | 6/2004 | Arimilli et al. |
| 6,810,467 B1 | 10/2004 | Khare et al. |
| 6,826,651 B2 | 11/2004 | Michael et al. |
| 6,868,481 B1 | 3/2005 | Gaither et al. |
| 6,868,485 B1 | 3/2005 | Conway |
| 6,922,755 B1 | 7/2005 | Safranek et al. |
| 6,973,543 B1 | 12/2005 | Hughes |
| 7,206,934 B2 | 4/2007 | Pabla et al. |
| 7,523,327 B2 | 4/2009 | Cline et al. |
| 7,797,495 B1 | 9/2010 | Lepak |
| 8,812,786 B2 | 8/2014 | Beckmann et al. |
| 10,705,959 B2 | 7/2020 | Kalyanasundharam et al. |
| 11,119,926 B2 | 9/2021 | Kalyanasundharam et al. |
| 2002/0038407 A1 | 3/2002 | Mounes-Toussi et al. |
| 2002/0083274 A1 | 6/2002 | Gharachorloo et al. |
| 2003/0093621 A1* | 5/2003 | DeSota ............... G06F 12/0848 711/E12.021 |
| 2003/0154345 A1 | 8/2003 | Lyon |
| 2003/0217234 A1 | 11/2003 | Rowlands |
| 2004/0088496 A1 | 5/2004 | Glasco et al. |
| 2004/0268061 A1 | 12/2004 | Khare et al. |
| 2005/0154831 A1 | 7/2005 | Steely, Jr. et al. |
| 2005/0160240 A1 | 7/2005 | Van Doren et al. |
| 2005/0251626 A1 | 11/2005 | Glasco |
| 2007/0055826 A1 | 3/2007 | Morton et al. |
| 2007/0156972 A1 | 7/2007 | Uehara et al. |
| 2008/0086601 A1 | 4/2008 | Gaither et al. |
| 2008/0104330 A1 | 5/2008 | Deshpande |
| 2008/0244134 A1 | 10/2008 | Hosomi et al. |
| 2009/0249318 A1 | 10/2009 | Ayguade et al. |
| 2010/0005245 A1 | 1/2010 | Beers et al. |
| 2010/0191914 A1 | 7/2010 | Cantin |
| 2012/0210068 A1 | 8/2012 | Joshi et al. |
| 2012/0317362 A1* | 12/2012 | Hendry ............... G06F 12/0831 711/146 |
| 2013/0097385 A1* | 4/2013 | Beckmann .......... G06F 12/0817 711/128 |
| 2013/0290643 A1 | 10/2013 | Lim et al. |
| 2014/0032848 A1 | 1/2014 | Zhao et al. |
| 2014/0189243 A1* | 7/2014 | Cuesta ................ G06F 12/0864 711/128 |
| 2014/0379997 A1 | 12/2014 | Blaner et al. |
| 2015/0058570 A1 | 2/2015 | Wang et al. |
| 2015/0242318 A1 | 8/2015 | Bernard et al. |
| 2016/0357671 A1 | 12/2016 | Kuskin |

FOREIGN PATENT DOCUMENTS

| | | |
|---|---|---|
| JP | 2005234854 A | 9/2005 |
| WO | 2012035605 A1 | 3/2012 |

OTHER PUBLICATIONS

Martin et al., "Using Destination-Set Prediction to Improve the Latency/Bandwidth Tradeoff in Shared-Memory Multiprocessors", Proceedings of the 30th Annual Symposium on Computer Architecture, Jun. 9, 2003, pp. 206-217.
Communication pursuant to Article 94(3) EPC in European Application No. 18783264.7, dated Mar. 30, 2021, 6 pages.
Zhao et al., "Protozoa: Adaptive Granularity Cache Coherence", ISCA '13: Proceedings of the 40th Annual International Symposium on Computer Architecture, Jun. 23, 2013, pp. 547-558.
First Examination Report in Indian Patent Application No. 202017030377, dated Mar. 25, 2022, 6 pages.
Non-Final Office Action in Japanese Patent Application No. 2020-552670, dated Nov. 8, 2022, 11 pages.
Communication pursuant to Article 94(3) EPC in European Patent Application No. 18783264.7, dated Feb. 15, 2023, 5 pages.

* cited by examiner

REGION BASED DIRECTORY SCHEME TO ADAPT TO LARGE CACHE SIZES

CROSS REFERENCE TO RELATED APPLICATIONS

This application is a continuation of U.S. patent application Ser. No. 15/846,008, now U.S. Pat. No. 11,119,926, entitled "REGION BASED DIRECTORY SCHEME TO ADAPT TO LARGE CACHE SIZES", filed Dec. 18, 2017, the entirety of which is incorporated herein by reference.

BACKGROUND

Description of the Related Art

Computer systems use main memory that is typically formed with inexpensive and high density dynamic random access memory (DRAM) chips. However DRAM chips suffer from relatively long access times. To improve performance, data processors typically include at least one local, high-speed memory known as a cache. In a multi-core data processor, each data processor core can have its own dedicated level one (L1) cache, while other caches (e.g., level two (L2), level three (L3)) are shared by data processor cores.

Cache subsystems in a computing system include high-speed cache memories configured to store blocks of data. As used herein, a "block" is a set of bytes stored in contiguous memory locations, which are treated as a unit for coherency purposes. As used herein, each of the terms "cache block", "block", "cache line", and "line" is interchangeable. In some embodiments, a block can also be the unit of allocation and deallocation in a cache. The number of bytes in a block is varied according to design choice, and can be of any size. In addition, each of the terms "cache tag", "cache line tag", and "cache block tag" is interchangeable.

In multi-node computer systems, special precautions must be taken to maintain coherency of data that is being used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One common coherency protocol is known as the "MOESI" protocol. According to the MOESI protocol, each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

Cache directories are a key building block in high performance scalable systems. A cache directory is used to keep track of the cache lines that are currently in use by the system. A cache directory improves both memory bandwidth as well as reducing probe bandwidth by performing a memory request or probe request only when required. Logically, the cache directory resides at the home node of a cache line which enforces the cache coherence protocol. The operating principle of a cache directory is inclusivity (i.e., a line that is present in a central processing unit (CPU) cache must be present in the cache directory). In a cache line based directory scheme, each cache line is tracked individually. Consequently, the size of the cache directory increases linearly with the total capacity of all of the CPU cache subsystems in the computing system. Over time, CPU cache sizes have grown significantly. As a consequence of this growth, maintaining a line-based cache directory has become very difficult.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
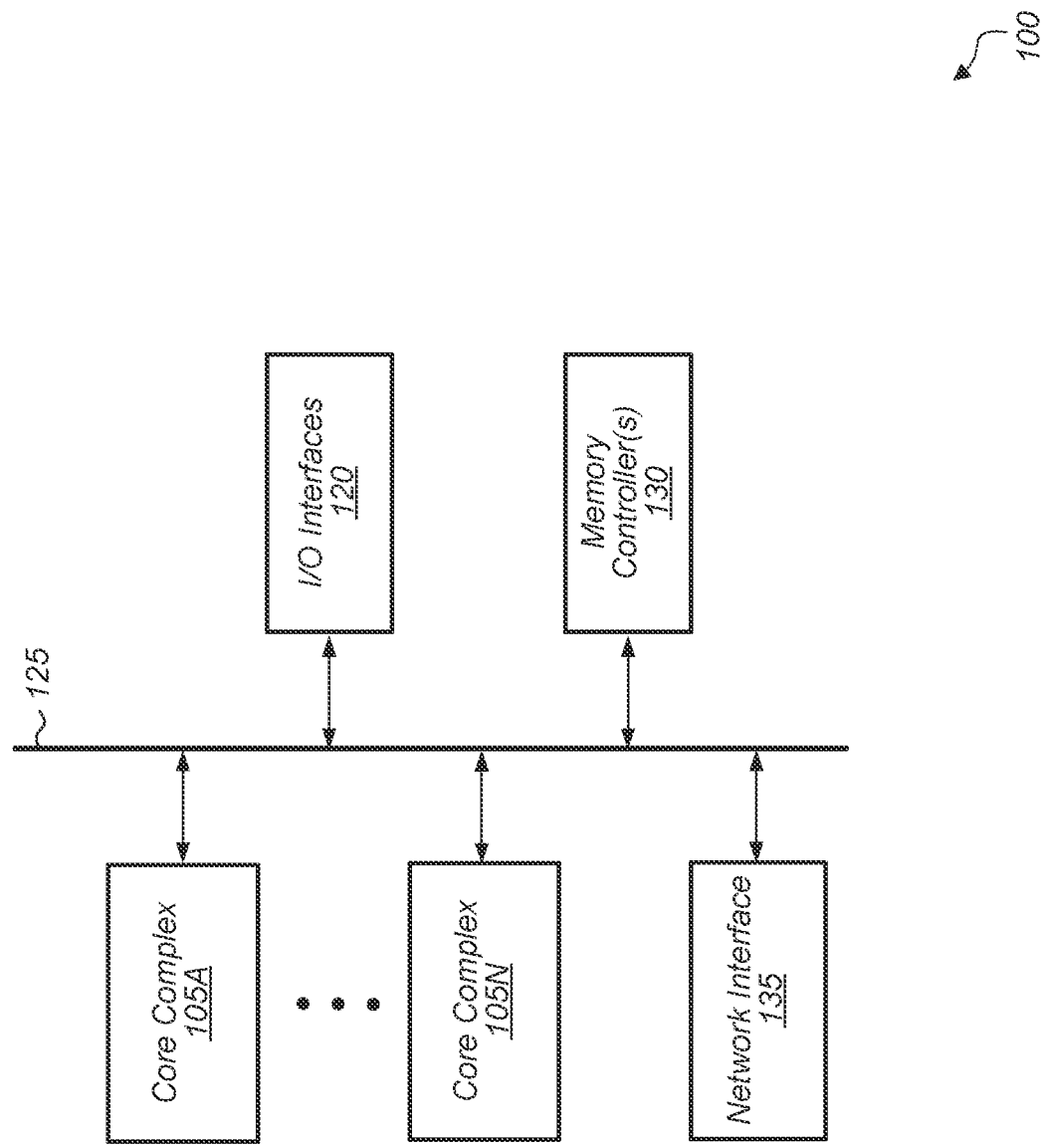
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing a region-based cache directory scheme to adapt to large cache sizes are disclosed herein. In one embodiment, a system includes at least a plurality of processing nodes, a memory, and a cache directory. Each processing node includes one or more processors and a cache subsystem. In one embodiment, the cache directory is configured to track portions of memory on a region basis, wherein each region includes a plurality of cache lines. The cache directory maintains an entry for each region of memory which has at least one cache line cached in any cache subsystem of the system. The cache directory also maintains a reference count for each entry, wherein the reference count is an aggregate sum of the number of cache lines of the region that are cached in all cache subsystems of the system. The cache directory reclaims a given entry responsive to a reference count for the given entry reaching zero.

In one embodiment, the cache directory allocates a first entry for a first region responsive to receiving an indication that a first cache line of the first region is being cached by a first cache subsystem of the system. The cache directory also initializes a reference count of the newly allocated first entry to one. The cache directory increments the reference count of the first entry to two responsive to receiving an indication that a second cache line of the first region is being cached by a second cache subsystem of the system, wherein the second cache line is not necessarily physically different from the first cache line. For each subsequent cache line of the first region that is cached by a cache subsystem, the cache directory increments the reference count.

In one embodiment, the cache directory tracks whether regions are private or shared. For example, the cache directory stores a first entry to track a first region. When the first region is private, a first field of the first entry is interpreted as having a first meaning. When the first region is shared, the first field of the first entry is interpreted as having a second meaning different from the first meaning. In one embodiment, the first field is interpreted as a CPU valid field when the first region is private, and the first field is interpreted as a cluster valid field when the first region is shared, with a cluster referring to a particular group of CPUs.

In one embodiment, the cache directory maintains a first array to track portions of memory at a first granularity. The cache directory also maintains a second array to track portions of memory at a second granularity, wherein the second granularity is a finer granularity than the first granularity. In this embodiment, the cache directory performs lookups to the first and second arrays in parallel in response to receiving a given memory request. The cache directory generates one or more probes based only on data extracted from a matching entry of the second array responsive to the lookups hitting in both the first and second arrays.

In one embodiment, the cache directory monitors reference count fields of entries in a first array. In one embodiment, the cache directory starts tracking a given region on a finer granularity basis responsive to detecting that the region has transitioned from private to shared. In this embodiment, the cache directory creates an entry in a second array responsive to receiving a memory request targeting the given region after detecting that the region has transitioned from private to shared. In another embodiment, the cache directory starts tracking a given region on a finer granularity basis responsive to detecting that a reference count for the given region has exceeded a programmable threshold. In this embodiment, the cache directory creates an entry in a second array responsive to receiving a memory request targeting the given region after detecting that the reference count has exceeded the threshold. In one embodiment, the first array is a region-based array and the second array is a line-based array.

Referring now to FIG. 1, a block diagram of one embodiment of a computing system 100 is shown. In one embodiment, computing system 100 includes at least core complexes 105A-N, input/output (I/O) interfaces 120, bus 125, memory controller(s) 130, and network interface 135. In other embodiments, computing system 100 can include other components and/or computing system 100 can be arranged differently. In one embodiment, each core complex 105A-N includes one or more general purpose processors, such as central processing units (CPUs). It is noted that a "core complex" can also be referred to as a "processing node" or a "CPU" herein. In some embodiments, one or more core complexes 105A-N can include a data parallel processor with a highly parallel architecture. Examples of data parallel processors include graphics processing units (GPUs), digital signal processors (DSPs), field programmable gate arrays (FPGAs), application specific integrated circuits (ASICs), and so forth. Each processor core within core complex 105A-N includes a cache subsystem with one or more levels of caches. In one embodiment, each core complex 105A-N includes a cache (e.g., level three (L3) cache) which is shared between multiple processor cores.

Memory controller(s) 130 are representative of any number and type of memory controllers accessible by core complexes 105A-N. Memory controller(s) 130 are coupled to any number and type of memory devices (not shown). For example, the type of memory in memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various embodiments, computing system 100 can be a server, computer, laptop, mobile device, game console, streaming device, wearable device, or any of various other types of computing systems or devices. It is noted that the number of components of computing system 100 can vary from embodiment to embodiment. There can be more or fewer of each component than the number shown in FIG. 1. It is also noted that computing system 100 can include other components not shown in FIG. 1. Additionally, in other embodiments, computing system 100 can be structured in other ways than shown in FIG. 1.

Figure 2:
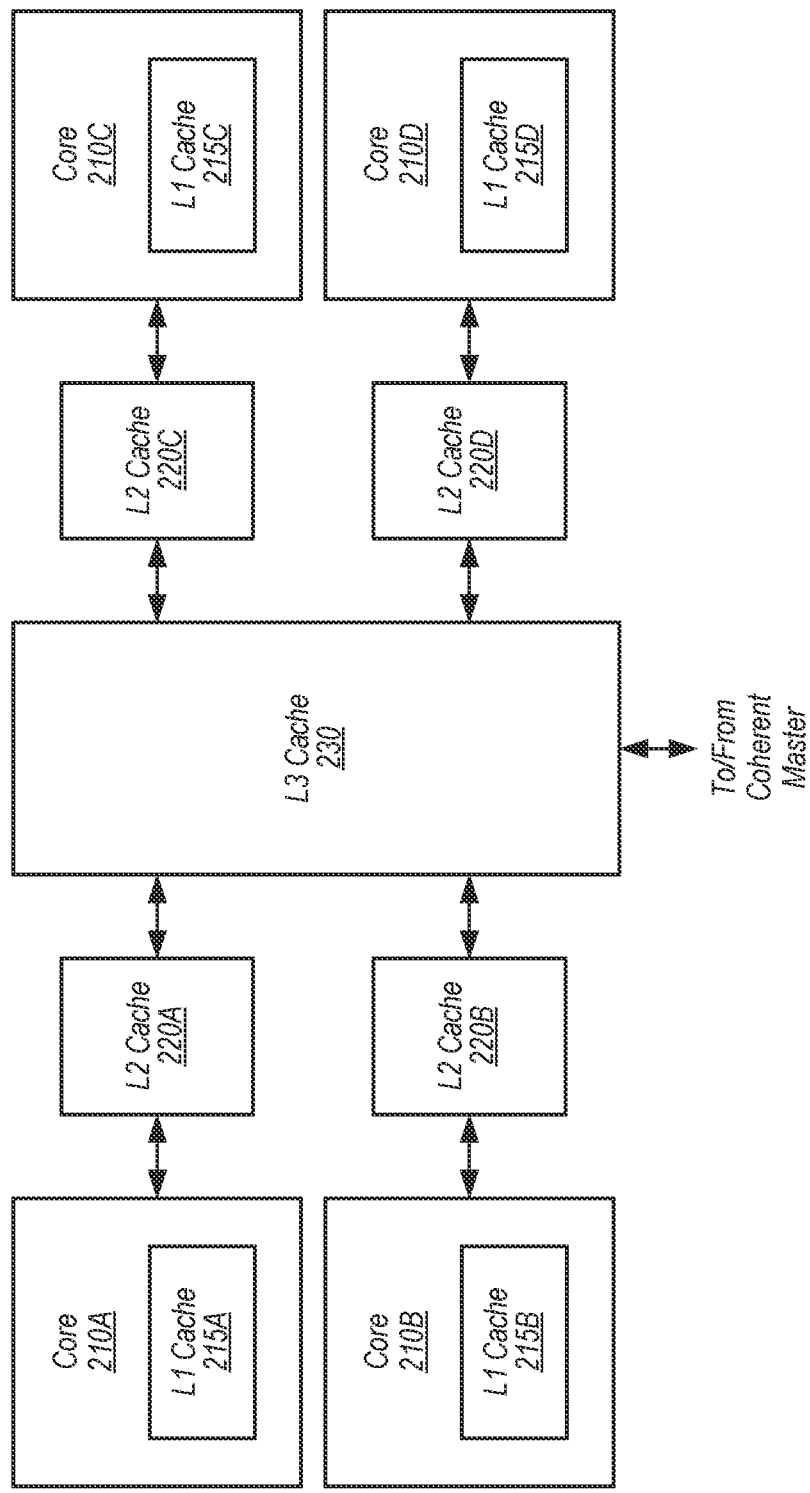
FIG. 2 is a block diagram of one embodiment of a core complex.

Turning now to FIG. 2, a block diagram of one embodiment of a core complex 200 is shown. In one embodiment, core complex 200 includes four processor cores 210A-D. In other embodiments, core complex 200 can include other numbers of processor cores. It is noted that a "core complex" can also be referred to as a "processing node" or "CPU" herein. In one embodiment, the components of core complex 200 are included within core complexes 105A-N (of FIG. 1).

Each processor core 210A-D includes a cache subsystem for storing data and instructions retrieved from the memory subsystem (not shown). For example, in one embodiment, each core 210A-D includes a corresponding level one (L1)

cache 215A-D. Each processor core 210A-D can include or be coupled to a corresponding level two (L2) cache 220A-D. Additionally, in one embodiment, core complex 200 includes a level three (L3) cache 230 which is shared by the processor cores 210A-D. L3 cache 230 is coupled to a coherent master for access to the fabric and memory subsystem. It is noted that in other embodiments, core complex 200 can include other types of cache subsystems with other numbers of caches and/or with other configurations of the different cache levels.

Figure 3:
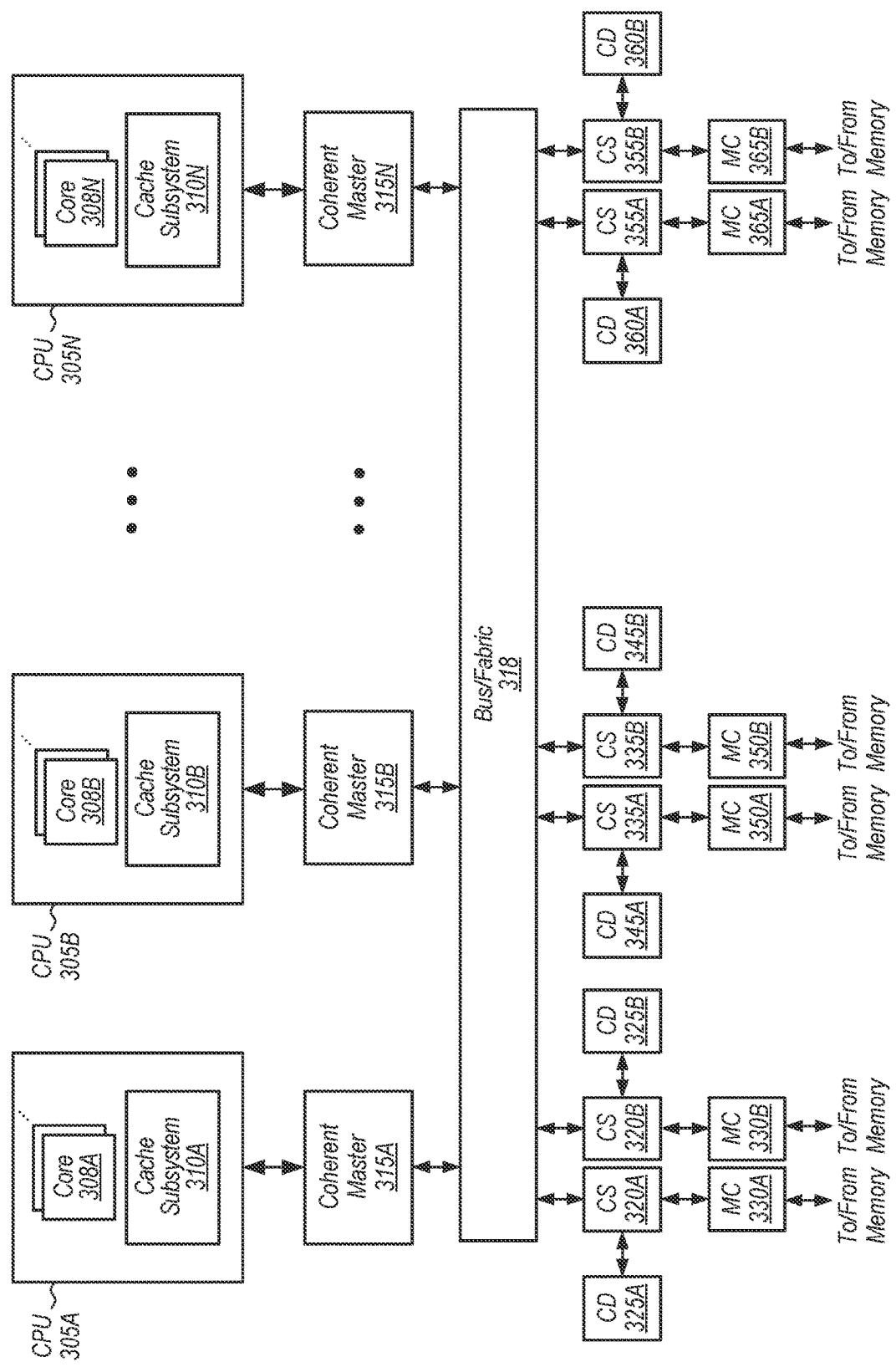
FIG. 3 is a block diagram of one embodiment of a multi-CPU system.

Referring now to FIG. 3, a block diagram of one embodiment of a multi-CPU system 300 is shown. In one embodiment, system includes multiple CPUs 305A-N. The number of CPUs per system can vary from embodiment to embodiment. Each CPU 305A-N can include any number of cores 308A-N, respectively, with the number of cores varying according to the embodiment. Each CPU 305A-N also includes a corresponding cache subsystem 310A-N. Each cache subsystem 310A-N can include any number of levels of caches and any type of cache hierarchy structure.

In one embodiment, each CPU 305A-N is connected to a corresponding coherent master 315A-N. As used herein, a "coherent master" is defined as an agent that processes traffic flowing over an interconnect (e.g., bus/fabric 318) and manages coherency for a connected CPU. To manage coherency, a coherent master receives and processes coherency-related messages and probes, and the coherent master generates coherency-related requests and probes. It is noted that a "coherent master" can also be referred to as a "coherent master unit" herein.

In one embodiment, each CPU 305A-N is coupled to a pair of coherent slaves via a corresponding coherent master 315A-N and bus/fabric 318. For example, CPU 305A is coupled through coherent master 315A and bus/fabric 318 to coherent slaves 320A-B. Coherent slave (CS) 320A is coupled to memory controller (MC) 330A and coherent slave 320B is coupled to memory controller 330B. Coherent slave 320A is coupled to cache directory (CD) 325A, with cache directory 325A including entries for memory regions that have cache lines cached in system 300 for the memory accessible through memory controller 330A. It is noted that cache directory 325A, and each of the other cache directories, can also be referred to as a "probe filter". Similarly, coherent slave 320B is coupled to cache directory 325B, with cache directory 325B including entries for memory regions that have cache lines cached in system 300 for the memory accessible through memory controller 330B. It is noted that the example of having two memory controllers per CPU is merely indicative of one embodiment. It should be understood that in other embodiments, each CPU 305A-N can be connected to other numbers of memory controllers besides two.

In a similar configuration to that of CPU 305A, CPU 305B is coupled to coherent slaves 335A-B via coherent master 315B and bus/fabric 318. Coherent slave 335A is coupled to memory via memory controller 350A, and coherent slave 335A is also coupled to cache directory 345A to manage the coherency of cache lines corresponding to memory accessible through memory controller 350A. Coherent slave 335B is coupled to cache directory 345B and coherent slave 335B is coupled to memory via memory controller 365B. Also, CPU 305N is coupled to coherent slaves 355A-B via coherent master 315N and bus/fabric 318. Coherent slaves 355A-B are coupled to cache directory 360A-B, respectively, and coherent slaves 355A-B are coupled to memory via memory controllers 365A-B, respectively. As used herein, a "coherent slave" is defined as an agent that manages coherency by processing received requests and probes that target a corresponding memory controller. It is noted that a "coherent slave" can also be referred to as a "coherent slave unit" herein. Additionally, as used herein, a "probe" is defined as a message passed from a coherency point to one or more caches in the computer system to determine if the caches have a copy of a block of data and optionally to indicate the state into which the cache should place the block of data.

When a coherent slave receives a memory request targeting its corresponding memory controller, the coherent slave performs a lookup to its corresponding cache directory to determine if the request targets a region which has at least one cache line cached in any of the cache subsystems. In one embodiment, each cache directory in system 300 tracks regions of memory, wherein a region includes a plurality of cache lines. The size of the region being tracked can vary from embodiment to embodiment. By tracking at a granularity of a region rather than at a finer granularity of a cache line, the size of each cache directory is reduced. It is noted that a "region" can also be referred to as a "page" herein. When a request is received by a coherent slave, the coherent slave determines the region which is targeted by the request. Then a lookup is performed of the cache directory for this region. If the lookup results in a hit, then the coherent slave sends a probe to the CPU(s) which are identified in the hit entry. The type of probe that is generated by the coherent slave depends on the coherency state specified by the hit entry.

It should be understood that although not shown in FIG. 3, in other embodiments there can be other connections from bus/fabric 318 to other components not shown to avoid obscuring the figure. For example, in another embodiment, bus/fabric 318 includes connections to one or more I/O interfaces and one or more I/O devices.

Figure 4:
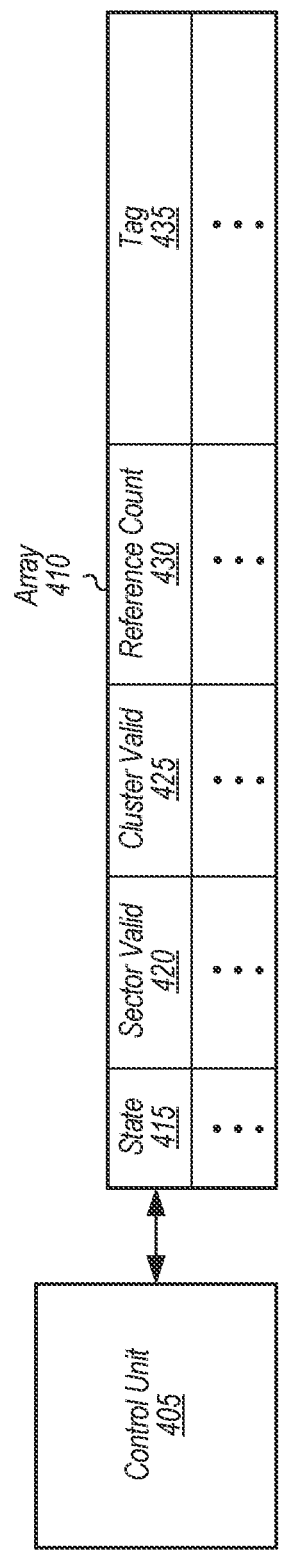
FIG. 4 is a block diagram of one embodiment of a cache directory.

Turning now to FIG. 4, a block diagram of one embodiment of a cache directory 400 is shown. In one embodiment, cache directory 400 includes control unit 405 and array 410. Array 410 can include any number of entries, with the number of entries varying according to the embodiment. In one embodiment, each entry of array 410 includes a state field 415, sector valid field 420, cluster valid field 425, reference count field 430, and tag field 435. In other embodiments, the entries of array 410 can include other fields and/or can be arranged in other suitable manners.

The state field 415 includes state bits that specify the aggregate state of the region. The aggregate state is a reflection of the most restrictive cache line state for this particular region. For example, the state for a given region is stored as "dirty" even if only a single cache line for the entire given region is dirty. Also, the state for a given region is stored as "shared" even if only a single cache line of the entire given region is shared.

The sector valid field 420 stores a bit vector corresponding to sub-groups or sectors of lines within the region to provide fine grained tracking. By tracking sub-groups of lines within the region, the number of unwanted regular coherency probes and individual line probes generated while unrolling a region invalidation probe can be reduced. As used herein, a "region invalidation probe" is defined as a probe generated by the cache directory in response to a region entry being evicted from the cache directory. When a coherent master receives a region invalidation probe, the coherent master invalidates each cache line of the region that is cached by the local CPU. Additionally, tracker and sector valid bits are included in the region invalidate probes to reduce probe amplification at the CPU caches.

The organization of sub-groups and the number of bits in sector valid field 420 can vary according to the embodiment. In one embodiment, two lines are tracked within a particular region entry using sector valid field 420. In another embodiment, other numbers of lines can be tracked within each region entry. In this embodiment, sector valid field 420 can be used to indicate the number of partitions that are being individually tracked within the region. Additionally, the partitions can be identified using offsets which are stored in sector valid field 420. Each offset identifies the location of the given partition within the given region. Sector valid field 420, or another field of the entry, can also indicate separate owners and separate states for each partition within the given region.

The cluster valid field 425 includes a bit vector to track the presence of the region across various CPU cache clusters. For example, in one embodiment, CPUs are grouped together into clusters of CPUs. The bit vector stored in cluster valid field 425 is used to reduce probe destinations for regular coherency probes and region invalidation probes.

The reference count field 430 is used to track the number of cache lines of the region which are cached somewhere in the system. On the first access to a region, an entry is installed in table 410 and the reference count field 430 is set to one. Over time, each time a cache accesses a cache line from this region, the reference count is incremented. As cache lines from this region get evicted by the caches, the reference count decrements. Eventually, if the reference count reaches zero, the entry is marked as invalid and the entry can be reused for another region. By utilizing the reference count field 430, the incidence of region invalidate probes can be reduced. The reference count filed 430 allows directory entries to be reclaimed when an entry is associated with a region with no active subscribers. In one embodiment, the reference count field 430 can saturate once the reference count crosses a threshold. The threshold can be set to a value large enough to handle private access patterns while sacrificing some accuracy when handling widely shared access patterns for communication data. The tag field 435 includes the tag bits that are used to identify the entry associated with a particular region.

Figure 5:
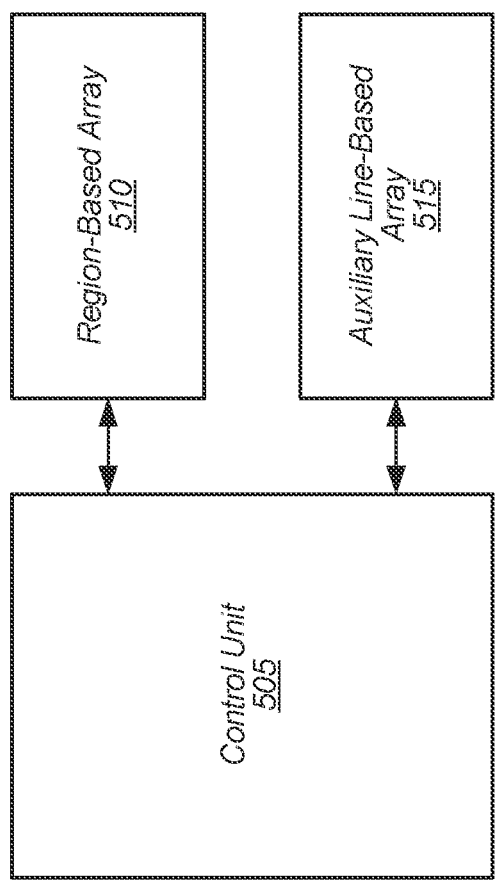
FIG. 5 is a block diagram of another embodiment of a cache directory.

Referring now to FIG. 5, a block diagram of another embodiment of a cache directory 500 is shown. In one embodiment, cache directory 500 includes at least control unit 505 coupled to region-based array 510 and auxiliary line-based array 515. Region-based array 510 includes entries to track cached data on a region-basis. In one embodiment, each entry of region-based array 510 includes a reference count to count the number of accesses to cache lines of the region that are cached by the cache subsystems of the computing system (e.g., system 300 of FIG. 3). In one embodiment, when the reference count for a given region reaches a threshold, the given region will start being tracked on a line-basis by auxiliary line-based array 515.

Accordingly, in one embodiment, when the number of cache lines that are cached for a given region reaches a threshold, auxiliary line-based array 515 will start to track the accesses to individual lines of the given region. Each time a new cache line is accessed from the given region, a new entry is created in auxiliary line-based array 515 for the cache line. In one embodiment, lookups are performed in parallel to region-based array 510 and line-based array 515.

In one embodiment, only shared regions that have a reference count greater than a threshold will be tracked on a cache line-basis by auxiliary line-based array 515. A shared region refers to a region that has cache lines stored in cache subsystems of at least two different CPUs. A private region refers to a region that has cache lines that are cached by only a single CPU. Accordingly, in one embodiment, for shared regions that have a reference count greater than a threshold, there will be one or more entries in the line-based array 515. In this embodiment, for private regions, there will not be any entries in the line-based array 515.

Figure 6:
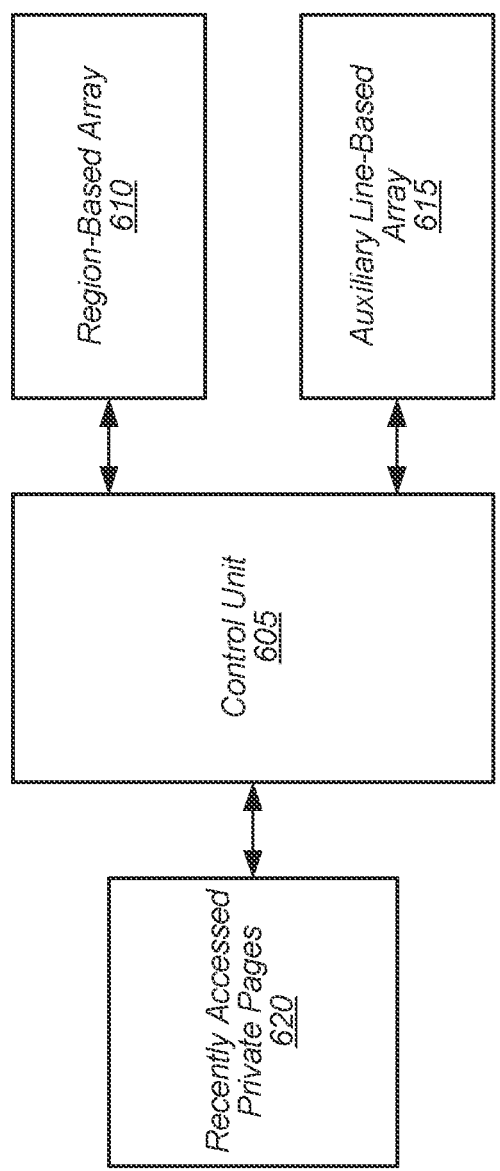
FIG. 6 is a block diagram of another embodiment of a cache directory.

Turning now to FIG. 6, a block diagram of another embodiment of a cache directory 600 is shown. In one embodiment, cache directory 600 includes control unit 605, region-based array 610, auxiliary line-based array 615, and structure 620 for caching the N most recently accessed private pages. It is noted that N is a positive integer which can vary according to the embodiment.

In one embodiment, structure 620 includes storage locations to temporarily cache entries for the last N visited private pages. When control unit 605 receives a memory request or invalidation request that matches an entry in structure 620, control unit 605 is configured to increment or decrement the reference count, modify the cluster valid field and/or sector valid field, etc. outside of the arrays 610 and 615. Accordingly, rather than having to read and write to entries in arrays 610 and 615 for every access, accesses to recently accessed private pages 620 can bypass accesses to arrays 610 and 615. The use of structure 620 can help speed up updates to the cache directory 600 for these private pages.

In one embodiment, I/O transactions that are not going to modify the sector valid or the cluster valid bits can benefit from structure 620 for caching the N most recently accessed private pages. Typically, I/O transactions will only modify the reference count for a given entry, and rather than performing a read and write of array 610 or 615 each time, structure 620 can be updated instead.

Accordingly, structure 620 enables efficient accesses to the cache directory 600. In one embodiment, incoming requests perform a lookup of structure 620 before performing lookups to arrays 610 and 615. In one embodiment, while an incoming request is allocated in an input queue of a coherent slave (e.g., coherent slave 320A of FIG. 3), control unit 605 determines whether there is a hit or miss in structure 620. Later, when the request reaches the head of the queue, control unit 605 already knows if the request is a hit in structure 620. If the request is a hit in structure 620, the lookup to arrays 610 and 615 can be avoided.

Figure 7:
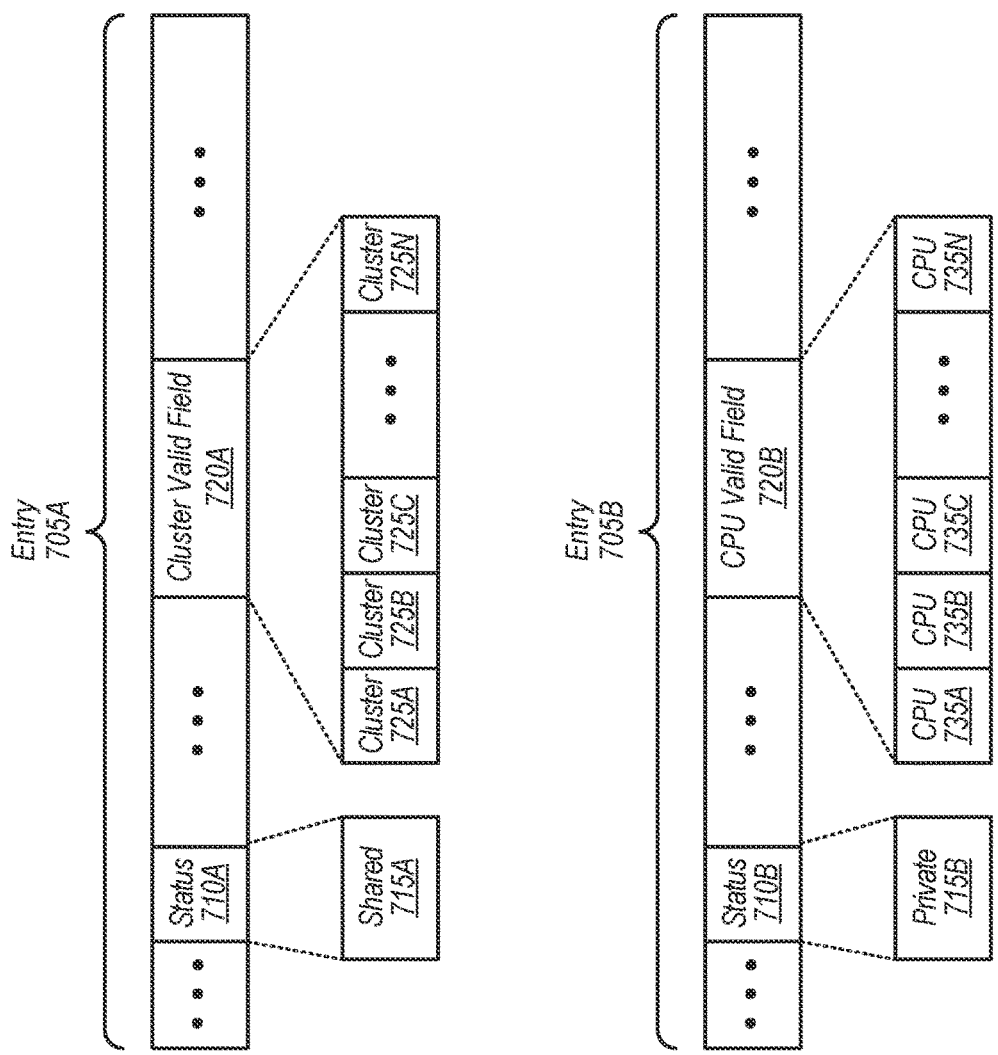
FIG. 7 is a diagram of one embodiment of repurposing a cluster valid field in a cache directory entry.

Referring now to FIG. 7, a diagram of one embodiment of repurposing a cluster valid field in a cache directory entry is shown. In one embodiment, entry 705A includes various fields associated with a shared region being tracked by a cache directory. The status field 710A stores a shared encoding 715A to indicate that the corresponding region is shared. As used herein, a "shared" region refers to a region which has cache lines that are cached by multiple different CPU clusters. When the status field 710A stores a shared encoding 715A, the cluster valid field 720A stores a bit vector to indicate which CPU clusters 725A-N are caching a cache line of the corresponding region. In this example, the cluster valid field 720A is grouping CPUs together into clusters. In one embodiment, if a cluster bit 725A-N is set to one, then this indicates that the cluster of CPUs stores at least one cache line from the region. Otherwise, if a cluster bit 725A-N is set to zero, then this indicates that none of the CPUs in the cluster stores a cache line from the region. Entry 705A can also include any number of other fields which are not shown to avoid obscuring the figure.

If the cluster valid field 720A were to remain unchanged even for a private region, a probe would need to be sent to all of the CPUs in the cluster that is identified as caching at least one cache line of that region. Rather, in one embodiment, if a region is private (i.e., accessed by only a single cluster), then the cluster valid field is repurposed into an owner valid field or CPU valid field. This allows the cache directory to probe one particular CPU for a private region.

Accordingly, if the region being tracked by entry 705A transitions from being a shared region to being a private region, then the entry 705B represents the change in fields as compared to entry 705A for this private region. As shown in entry 705B, status 710B now includes a private 715B encoding to represent the private status of the region. Since the status 710B has now changed to private 715B, the previous cluster valid field 720A now becomes CPU valid field 720B. Each bit 735A-N of the bit vector stored in CPU valid field 720B represents a single CPU of the original cluster. If a given CPU of this cluster caches at least one cache line of the corresponding region, then the particular CPU 735A-N bit is set to one. Otherwise, if a given CPU of the cluster does not cache any cache lines from the region, then the corresponding CPU 735A-N bit is set to zero.

By changing the cluster valid field 720A to CPU valid field 720B, a directed probe can be sent out which is targeted to only the CPUs which have a cache line from the region. This helps to reduce the number of unnecessary probes generated by the cache directory. In one embodiment, if a request targeting the private region (corresponding to entry 705B) is received from a different cluster, then this private region becomes a shared region. When this happens, the cluster valid field 720A is restored to its normal operation since the region is now shared.

Figure 8:
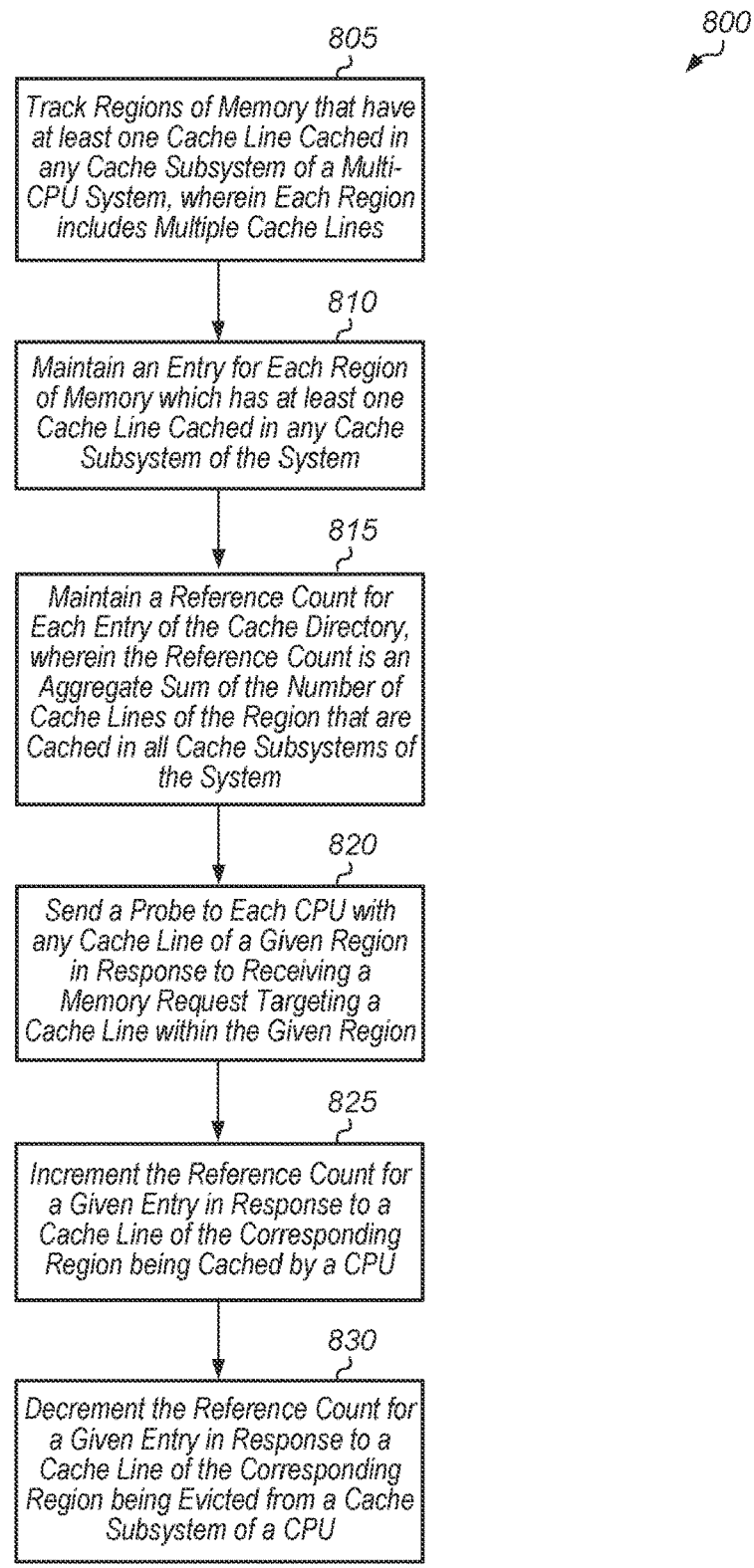
FIG. 8 is a generalized flow diagram illustrating one embodiment of a method for maintaining a region-based cache directory.

Turning now to FIG. 8, one embodiment of a method 800 for maintaining a region-based cache directory is shown. For purposes of discussion, the steps in this embodiment and those of FIG. 9-13 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 800.

A cache directory tracks regions of memory that have at least one cache line cached in any cache subsystem of a multi-CPU system, wherein each region includes multiple cache lines (block 805). The cache directory maintains an entry for each region of memory which has at least one cache line cached in any cache subsystem of the system (block 810). The cache directory maintains a reference count for each entry of the cache directory, wherein the reference count is an aggregate sum of the number of cache lines of the region that are cached in all cache subsystems of the system (block 815). The cache directory sends a probe to each CPU with any cache line of a given region in response to receiving a memory request targeting a cache line within the given region (block 820). The cache directory increments the reference count for a given entry in response to a cache line of the corresponding region being cached by a CPU (block 825). The cache directory decrements the reference count for a given entry in response to a cache line of the corresponding region being evicted from a cache subsystem of a CPU (block 830). After block 830, method 800 ends.

Figure 9:
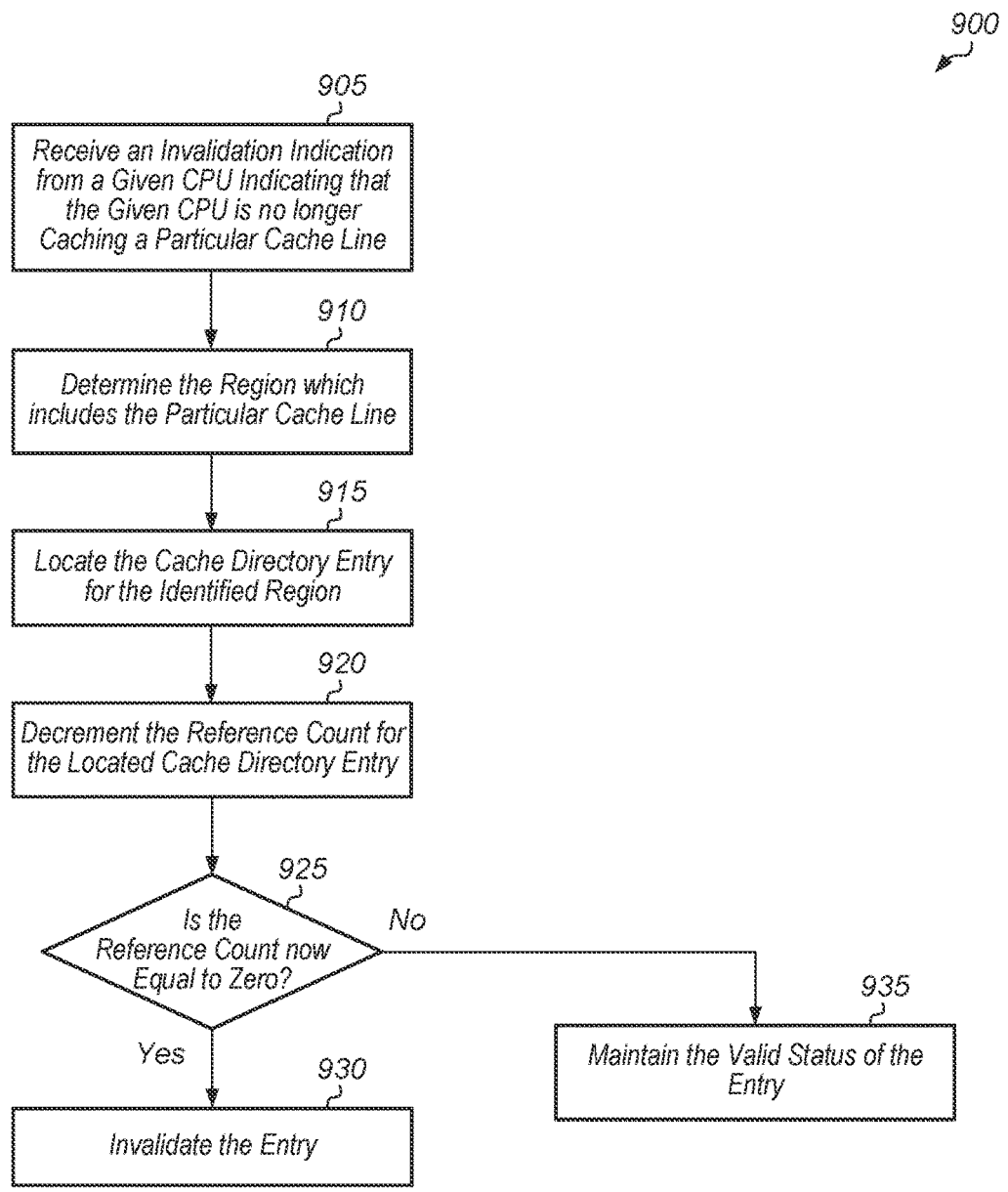
FIG. 9 is a generalized flow diagram illustrating one embodiment of a method for coherent slave processing an invalidation indication from a CPU.

Referring now to FIG. 9, one embodiment of method 900 for a coherent slave processing an invalidation indication from a CPU is shown. A coherent slave receives an invalidation indication from a given CPU indicating that the given CPU is no longer caching a particular cache line (block 905). In response to receiving the invalidation indication, the coherent slave determines the region of the particular cache line (block 910). Next, the coherent slave locates the cache directory entry for the identified region (block 915).

Then, the coherent slave decrements the reference count in the located cache director entry for the identified region (block 920). If the reference count is now equal to zero (conditional block 925, "yes" leg), then the coherent slave invalidates the entry (block 930). The entry can now be reused to allocate a new entry when a memory request is received targeting a region without a cache directory entry. If the reference count is still greater than zero (conditional block 925, "no" leg), then the coherent slave maintains the valid status of the entry (block 935). After blocks 930 and 935, method 900 ends.

Figure 10:
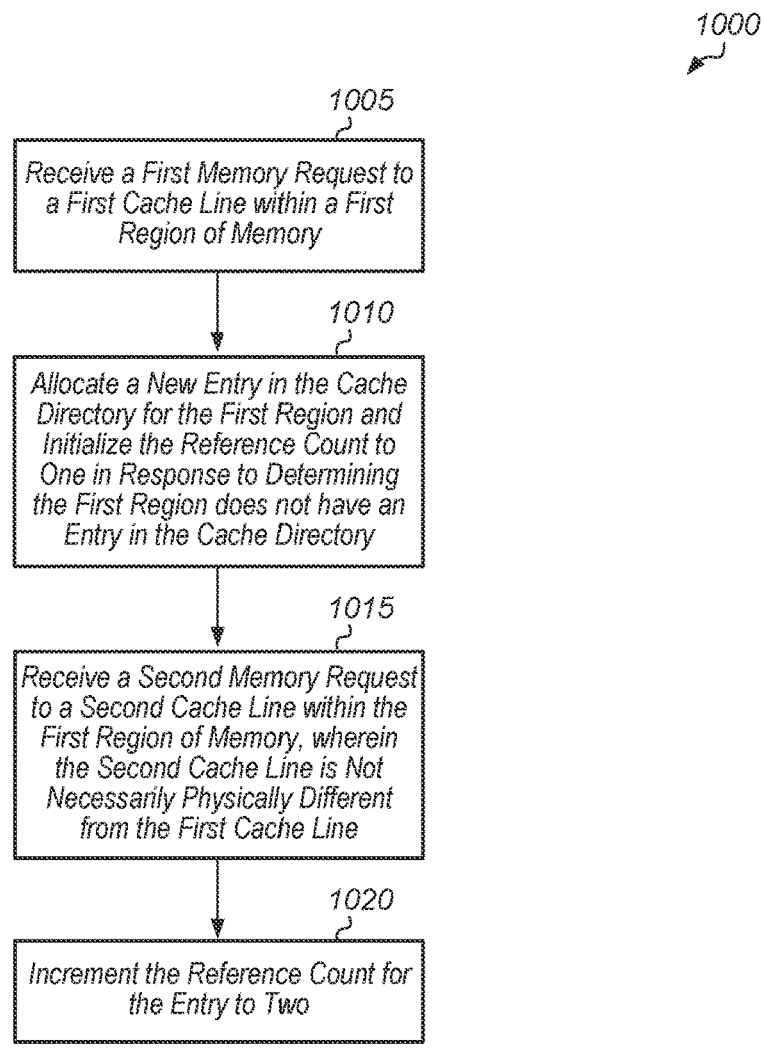
FIG. 10 is a generalized flow diagram illustrating one embodiment of a method for a cache directory tracking accesses to a first region of memory.

Turning now to FIG. 10, one embodiment of a method 1000 for a cache directory tracking accesses to a first region of memory is shown. A cache directory receives a first memory request to a first cache line within a first region of memory (block 1005). In response to determining the first region does not have an entry in the cache directory, a new entry is allocated in the cache directory for the first region and the reference count for the new entry is initialized to one (block 1010). The cache directory evicts an existing entry to allocate the new entry if the cache directory is full. The cache directory can utilize any suitable eviction algorithm to determine which entry to evict. Next, the cache directory receives a second memory request to a second cache line within the first region of memory, wherein the second cache line is not necessarily physically different from the first cache line (block 1015). In response to receiving the second memory request to the first region of memory, the reference count for the entry corresponding to the first region of memory is incremented to two (block 1020). After block 1020, method 1000 ends. It is noted that the reference count for the entry corresponding to the first region of memory is incremented for each subsequent memory request to any cache line within the first region. Also, the reference count is decremented each time a cache line from the first region is evicted from a cache subsystem.

Figure 11:
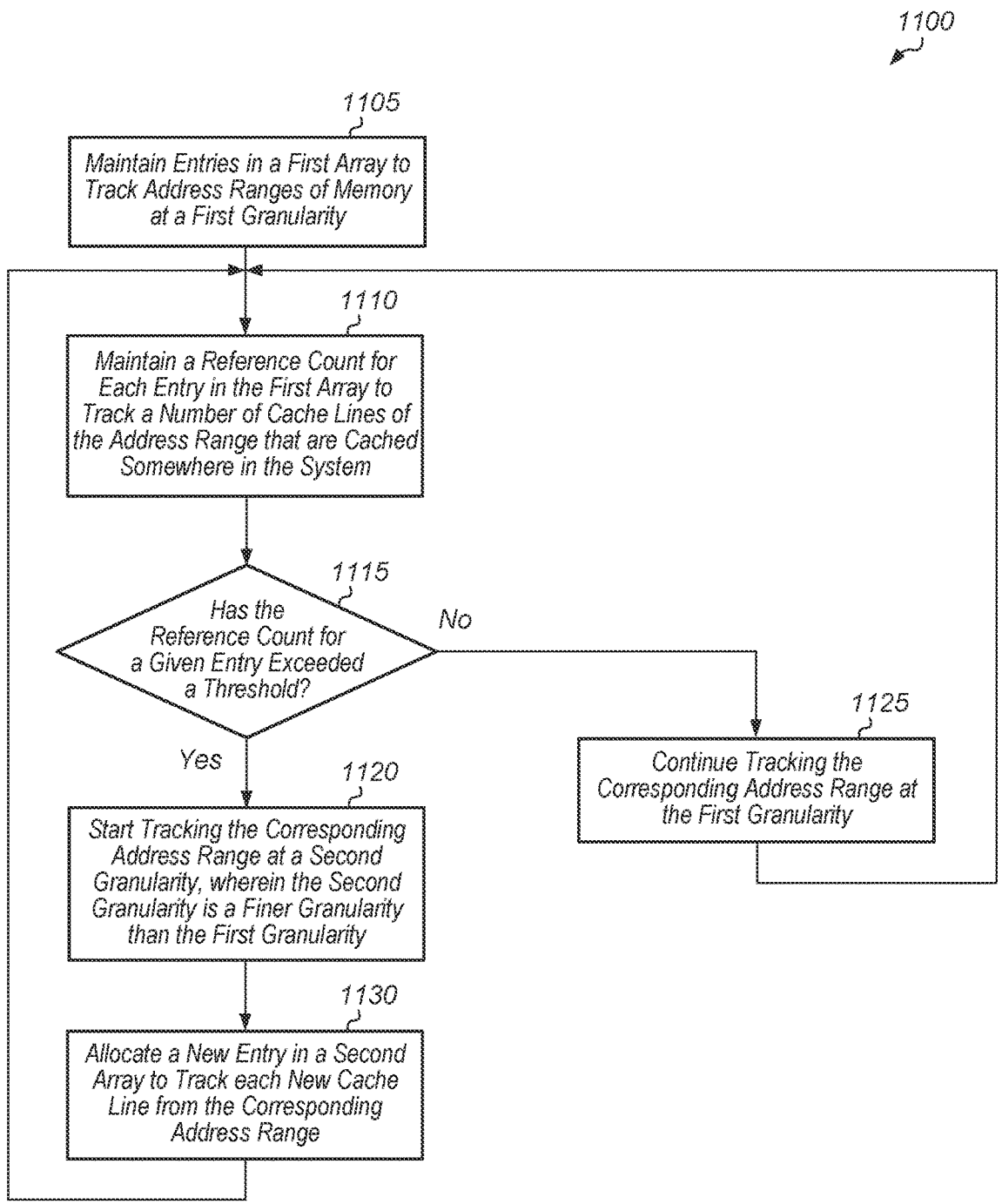
FIG. 11 is a generalized flow diagram illustrating one embodiment of a method for maintaining arrays of a cache directory at different granularity levels.

Referring now to FIG. 11, one embodiment of a method 1100 for maintaining arrays of a cache directory at different granularity levels is shown. A cache directory maintains entries in a first array to track address ranges of memory at a first granularity (block 1105). In one embodiment, the first granularity is a page of memory. In one embodiment, the page is 4 kilobytes (KB). In other embodiments, the first granularity can correspond to other address range sizes.

The cache directory maintains a reference count for each entry in the first array to track a number of cache lines of the region that are cached somewhere in the system (block 1110). If the reference count for a given entry exceeds a programmable threshold (conditional block 1115, "yes" leg), then the cache directory starts tracking the corresponding address range at a second granularity, wherein the second granularity is a finer granularity than the first granularity (block 1120). In one embodiment, the second granularity corresponds to a cache line. In one embodiment, a cache line includes 64 bytes. In other embodiments, other sizes of cache lines can be utilized. If the reference count for a given entry is less than or equal to the programmable threshold (conditional block 1115, "no" leg), then the cache directory continues tracking the corresponding address range at the first granularity (block 1125). After block 1125, method 1100 returns to block 1110.

For each new cache line from the corresponding address range that is cached in the system, the cache directory allocates a new entry in a second array to track this portion of the region at the second granularity (block 1130). The cache directory evicts an entry from the second array to allocate the new entry if the second array is full. The cache directory can utilize any suitable eviction algorithm to determine which entry to evict. After block 1130, method 1100 returns to block 1110.

Figure 12:
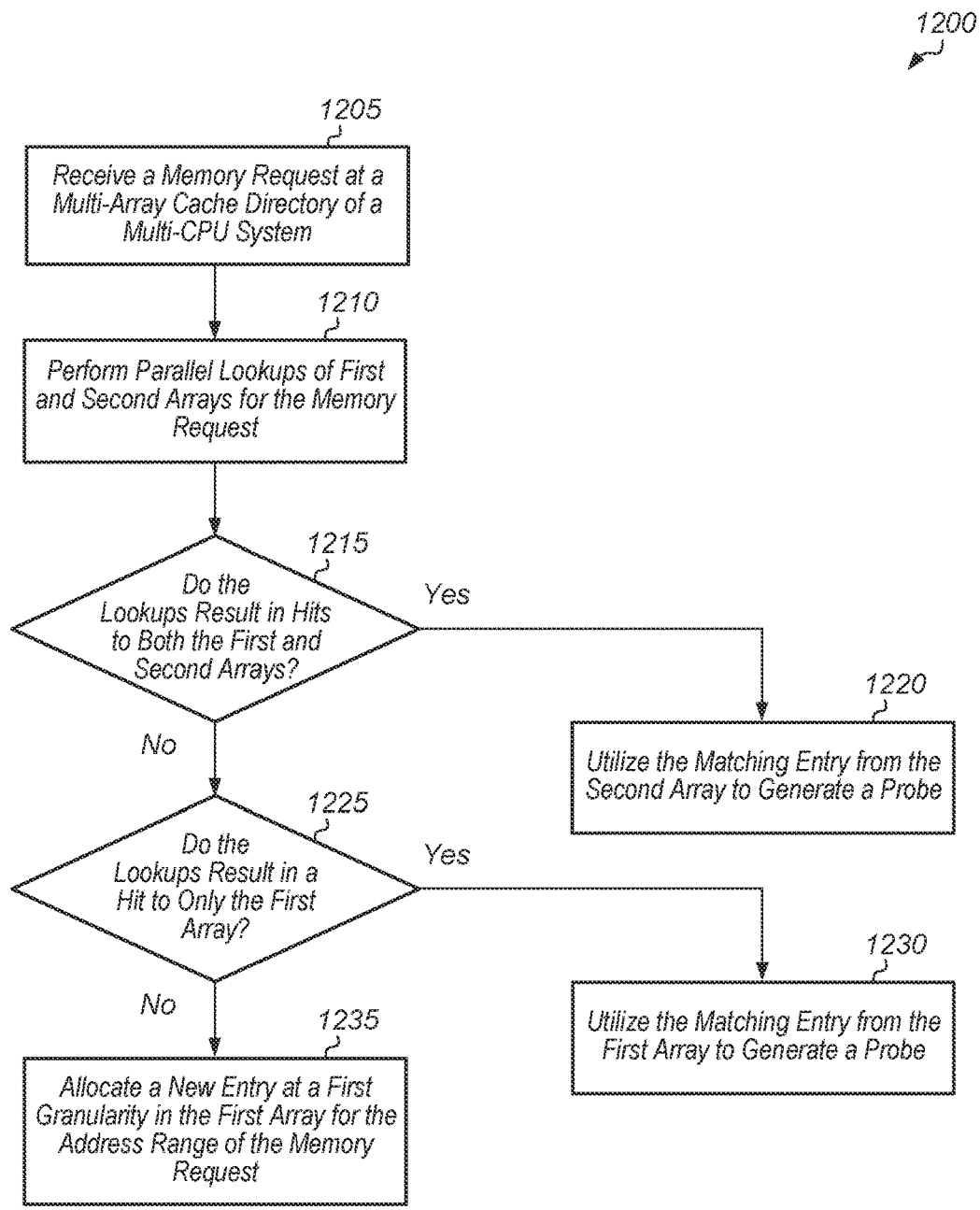
FIG. 12 is a generalized flow diagram illustrating one embodiment of a method for operating a multi-array cache directory.

Turning now to FIG. 12, one embodiment of a method 1200 for operating a multi-array cache directory is shown. A memory request is received at a multi-array cache directory of a multi-CPU system (block 1205). The cache directory performs parallel lookups of first and second arrays for the memory request (block 1210). In one embodiment, the first array tracks address ranges at a first granularity and the second array tracks address ranges at a second granularity, wherein the second granularity is a finer granularity than the first granularity. If the lookups result in hits for both the first and second arrays (conditional block 1215, "yes" leg), then the cache directory utilizes the matching entry from the second array to generate a probe (block 1220). If the lookups result in a hit to only the first array (conditional block 1225, "yes" leg), then the cache directory utilizes the matching entry from the first array to generate a probe (block 1230). If the lookups result in misses to both the first and second arrays (conditional block 1225, "no" leg), then the cache directory allocates a new entry at a first granularity in the first array for the address range of the memory request (block 1235). If the first array is full, then the cache directory can evict an existing entry from the first array. The cache directory can utilize any suitable technique for determining which existing entry to evict. If the cache directory evicts an existing entry from the first array, the cache directory sends invalidation probes to one or more CPUs which have cache lines of the corresponding address range. After blocks 1220, 1230, and 1235, method 1200 ends.

Figure 13:
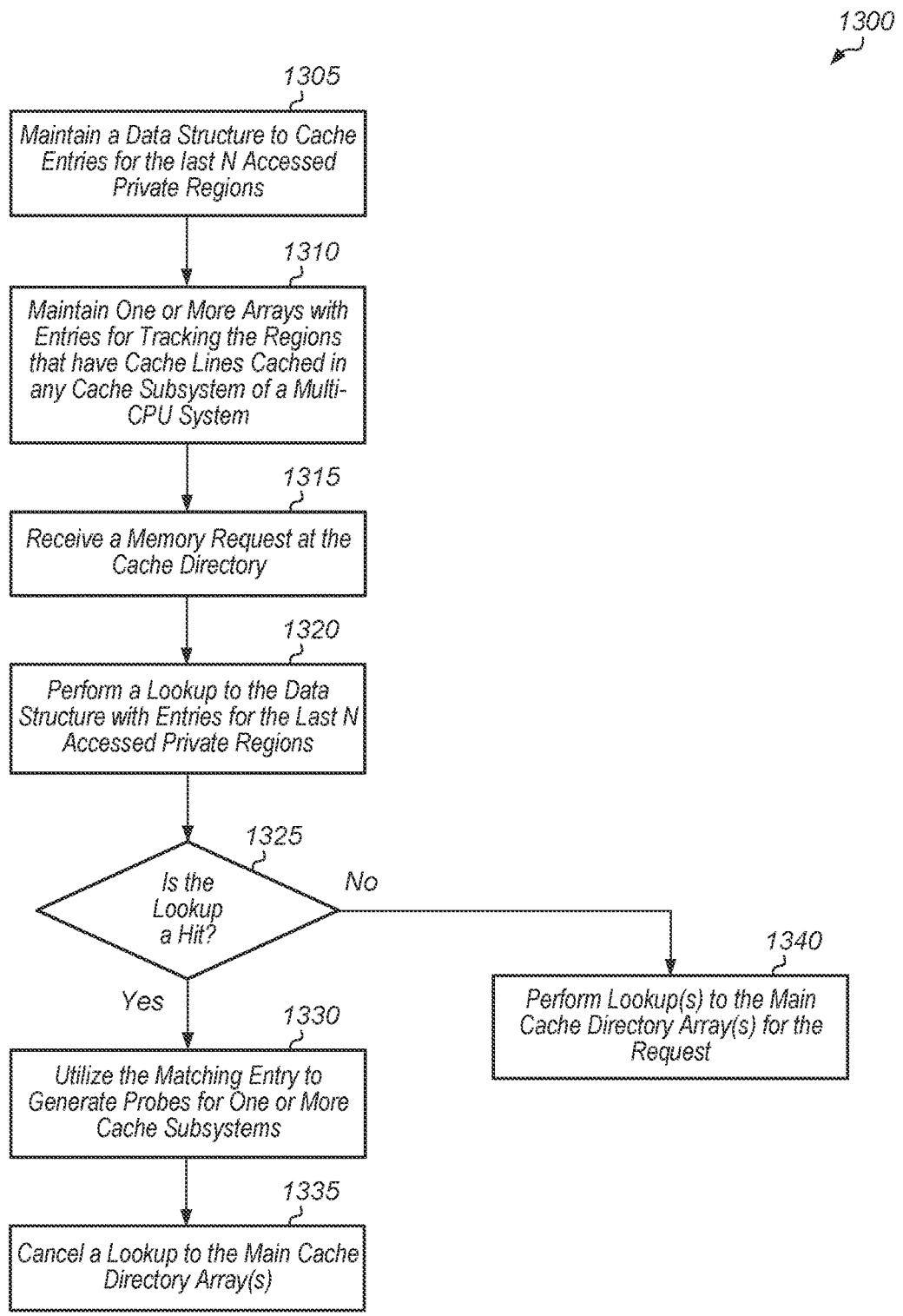
FIG. 13 is a generalized flow diagram illustrating one embodiment of a method for a cache directory maintaining a data structure with entries for the most recently visited private regions.

Referring now to FIG. 13, one embodiment of a method 1300 for a cache directory maintaining a data structure with entries for the most recently visited private regions is shown. A cache directory maintains a data structure to cache entries for the last N accessed private regions (block 1305). The value of N can vary according to the embodiment. The cache directory also maintains one or more arrays with entries for tracking the regions that have cache lines cached in any cache subsystem of a multi-CPU system (block 1310).

Next, a memory request is received at the cache directory (block 1315). In response to receiving the memory request, the cache directory performs a lookup to the data structure with entries for the last N accessed private regions (block 1320). If the lookup results in a hit (conditional block 1325, "yes" leg), then the cache directory utilizes the matching entry to generate probes for one or more cache subsystems (block 1330). Also, the cache directory cancels a lookup to the main cache directory array(s) (block 1335). If the lookup results in a miss (conditional block 1325, "no" leg), then the cache directory performs lookup(s) to the main cache directory array(s) for the request (block 1340). The cache directory can utilize any suitable processing procedure for processing the lookup to the main cache directory array. After blocks 1335 and 1340, method 1300 ends.

Figure 14:
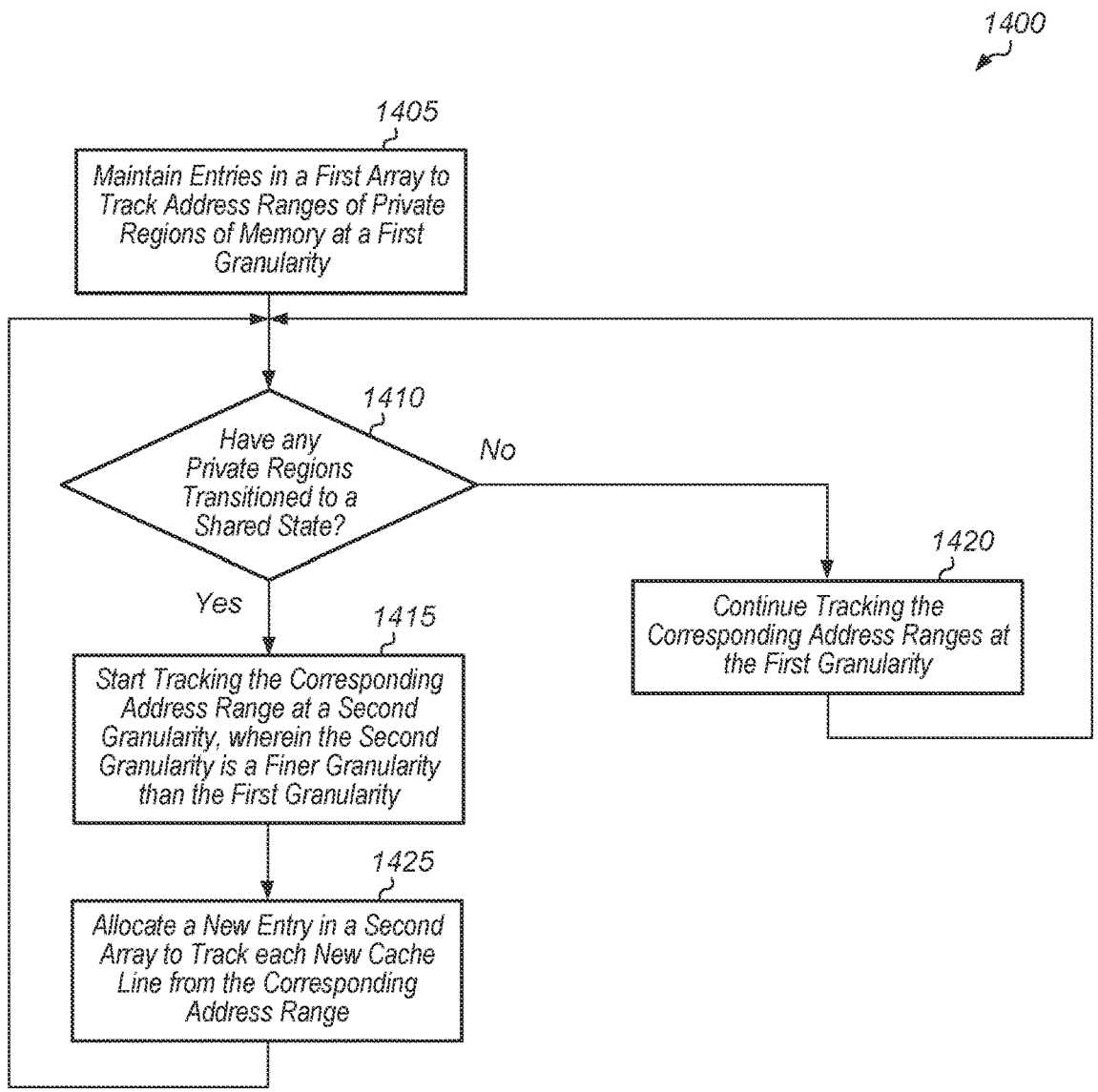
FIG. 14 is a generalized flow diagram illustrating one embodiment of a method for maintaining arrays of a cache directory at different granularity levels.

Turning now to FIG. 14, one embodiment of a method 1400 for maintaining arrays of a cache directory at different granularity levels is shown. A cache directory maintains entries in a first array to track address ranges of private regions of memory at a first granularity (block 1405). In one embodiment, the first granularity is a page of memory. In one embodiment, the page is 4 KB. In other embodiments, the first granularity can correspond to other address range sizes.

The cache directory determines if any of the private regions have transitioned to a shared state (conditional block 1410). If any of the private regions has transitioned to a shared state (conditional block 1410, "yes" leg), then the cache directory starts tracking the corresponding address range at a second granularity, wherein the second granularity is a finer granularity than the first granularity (block 1415). In one embodiment, the second granularity corresponds to a cache line. In one embodiment, a cache line includes 64 bytes. In other embodiments, other sizes of cache lines can be utilized. If none of the private regions have transitioned to a shared state (conditional block 1410, "no" leg), then the cache directory continues tracking the corresponding address ranges at the first granularity (block 1420). After block 1420, method 1400 returns to block 1410.

For each new cache line from the corresponding address range that is cached in the system, the cache directory allocates a new entry in a second array to track this portion of the region at the second granularity (block 1425). The cache directory evicts an entry from the second array to allocate the new entry if the second array is full. The cache directory can utilize any suitable eviction algorithm to determine which entry to evict. After block 1425, method 1400 returns to block 1410.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
 a cache directory configured to:
  maintain, in first storage, an entry for each region of memory which has at least one cache line cached in any of a plurality of cache subsystems, wherein a region comprises a plurality of cache lines;
  maintain a count that indicates how many cache lines of a given region are cached; and
  allocate an entry in a second storage to track the given region on a finer granularity basis, responsive to detecting the count has exceeded a threshold, wherein the finer granularity basis is a sub-region basis.

2. The apparatus as recited in claim 1, wherein:
   entries in the first storage identify one or more clusters that currently store a copy of a given cache line, without identifying a particular processor within a cluster that caches the given cache line; and
   entries in the second storage identify one or more particular processors that currently store the copy of the given cache line.

3. The apparatus as recited in claim 1, wherein the cache directory is configured to perform a lookup to both the first storage and the second storage in parallel, in response to receipt of a memory request.

4. The apparatus as recited in claim 1, wherein in response to detecting a hit on both the first storage and the second storage, the cache directory is configured to use a matching entry from the second storage to generate a probe.

5. The apparatus as recited in claim 1, wherein in response to determining a memory request misses on both the first storage and the second storage, the cache directory is configured to allocate a new entry in the first storage for the memory request.

6. The apparatus as recited in claim 5, wherein the new entry tracks a region of memory targeted by the memory request.

7. The apparatus as recited in claim 1, wherein the cache directory is configured to track whether regions are private or shared, wherein a shared region has one or more cache lines stored by multiple clusters and a private region has cache lines stored by only a single cluster.

8. The apparatus as recited in claim 1, wherein an entry in the cache directory corresponding to a given region comprises a first field, wherein:
   if the given region is private, the first field identifies one or more processors that store a cache line of the given region; and
   if the given region is shared, the first field identifies one or more clusters that store a cache line of the given region.

9. A method comprising:
   maintaining, in a first storage, an entry for each region of memory which has at least one cache line cached in any of a plurality of cache subsystems, wherein a region comprises a plurality of cache lines;
   maintaining a count that indicates how many cache lines of a given region are cached; and
   allocating an entry in a second storage to track the given region on a finer granularity basis, responsive to detecting the count has exceeded a threshold, wherein the finer granularity basis is a sub-region basis.

10. The method as recited in claim 9, wherein:
    entries in the first storage identify one or more clusters that currently store a copy of a given cache line, without identifying a particular processor within a cluster that caches the given cache line; and
    entries in the second storage identify one or more particular processors that currently store the copy of the given cache line.

11. The method as recited in claim 9, performing a lookup to both the first storage and the second storage in parallel, in response to receipt of a memory request.

12. The method as recited in claim 9, wherein in response to detecting a hit on both the first storage and the second storage, the method comprises using a matching entry from the second storage to generate a probe.

13. The method as recited in claim 9, wherein in response to determining a memory request misses on both the first storage and the second storage, the method comprises allocating a new entry in the first storage for the memory request.

14. The method as recited in claim 13, wherein the new entry tracks a region of memory targeted by the memory request.

15. The method as recited in claim 9, wherein the method comprises tracking whether regions are private or shared, wherein a shared region has one or more cache lines stored by multiple clusters and a private region has cache lines stored by only a single cluster.

16. The method as recited in claim 9, wherein a given entry corresponding to a given region comprises a first field, wherein:
    if the given region is private, the first field identifies one or more processors that store a cache line of the given region; and
    if the given region is shared, the first field identifies one or more clusters that store a cache line of the given region.

17. A system comprising:
    a plurality of processing nodes, wherein each processing node comprises one or more processors and a cache subsystem;
    a memory; and
    a cache directory configured to:
      maintain, in first storage, an entry for each region of memory which has at least one cache line cached in any of a plurality of cache subsystems, wherein a region comprises a plurality of cache lines;
      maintain a count that indicates how many cache lines of a given region are cached; and
      allocate an entry in a second storage to track the given region on a finer granularity basis, responsive to detecting the count has exceeded a threshold, wherein the finer granularity basis is a sub-region basis.

18. The system as recited in claim 17, wherein the cache directory is configured to track whether regions are private or shared, wherein a shared region has one or more cache lines stored by multiple clusters and a private region has cache lines stored by only a single cluster.

19. The system as recited in claim 18, wherein an entry in the cache directory corresponding to a given region comprises a first field, wherein:
    if the given region is private, the first field identifies one or more processors that store a cache line of the given region; and
    if the given region is shared, the first field identifies one or more clusters that store a cache line of the given region.

20. The system as recited in claim 17, wherein:
    entries in the first storage identify one or more clusters that currently store a copy of a given cache line, without identifying a particular processor within a cluster that caches the given cache line; and
    entries in the second storage identify one or more particular processors that currently store the copy of the given cache line.

* * * * *